(12) United States Patent
Stobbart et al.

(10) Patent No.: US 10,627,028 B2
(45) Date of Patent: Apr. 21, 2020

(54) MISALIGNMENT FLANGE FOR PIPELINE INSTALLATIONS

(71) Applicant: Freudenberg Oil & Gas, LLC, Houston, TX (US)

(72) Inventors: John Stobbart, Swansea (GB); Michael Sheehan, Swansea (GB)

(73) Assignee: Freudenberg Oil & Gas, LLC, Houston, TX (US)

( * ) Notice: Subject to any disclaimer, the term of this patent is extended or adjusted under 35 U.S.C. 154(b) by 90 days.

(21) Appl. No.: 15/978,293

(22) Filed: May 14, 2018

(65) Prior Publication Data
US 2019/0346076 A1 Nov. 14, 2019

(51) Int. Cl.
*F16L 27/053* (2006.01)
*F16L 27/06* (2006.01)

(52) U.S. Cl.
CPC .............. *F16L 27/053* (2013.01); *F16L 27/06* (2013.01)

(58) Field of Classification Search
CPC ......... F16L 27/053; F16L 27/06; F16L 27/02; F16L 27/023; F16L 27/04
USPC ........ 285/266, 272, 261, 263, 121.7, 123.15
See application file for complete search history.

(56) References Cited

U.S. PATENT DOCUMENTS

| | | | | |
|---|---|---|---|---|
| 872,121 A | * | 11/1907 | Greenlaw | ............... F16L 27/04 285/263 |
| 939,908 A | * | 11/1909 | Greenlaw | ............... F16L 27/04 285/263 |
| 979,513 A | * | 12/1910 | Koenig | ................. F16L 27/053 285/262 |
| 1,888,026 A | | 11/1932 | Chapman | |
| 2,117,152 A | * | 5/1938 | Crosti | ..................... F16L 27/04 285/263 |

(Continued)

FOREIGN PATENT DOCUMENTS

| | | |
|---|---|---|
| DE | 9207970 U1 | 9/1992 |
| DE | 29716930 U1 | 12/1997 |

(Continued)

OTHER PUBLICATIONS

Australian Office Action dated Nov. 1, 2019 (corresponding to AU 2019202895).

(Continued)

*Primary Examiner* — Aaron M Dunwoody
(74) *Attorney, Agent, or Firm* — Daniel J. Sepanik, Esq.; Harness, Dickey & Pierce, P.L.C.

(57) ABSTRACT

A pipeline misalignment flange includes a socket member having a first smaller spherical internal surface, the socket member having a first face surrounding the first substantially spherical internal surface, the first face having a recessed channel. A retainer member includes a second larger spherical internal surface, the socket member and the retainer member being fastened together. A ball member includes a first smaller spherical external surface for engaging the socket member and a second larger spherical external surface for engaging the retainer member. The second larger spherical external surface includes an axially protruding portion with an undercut, the ball member being pivotable relative to the socket member such that the axially protruding portion of the second larger spherical external surface is received in the recessed channel.

5 Claims, 2 Drawing Sheets

(56) References Cited

U.S. PATENT DOCUMENTS

Figure 1:
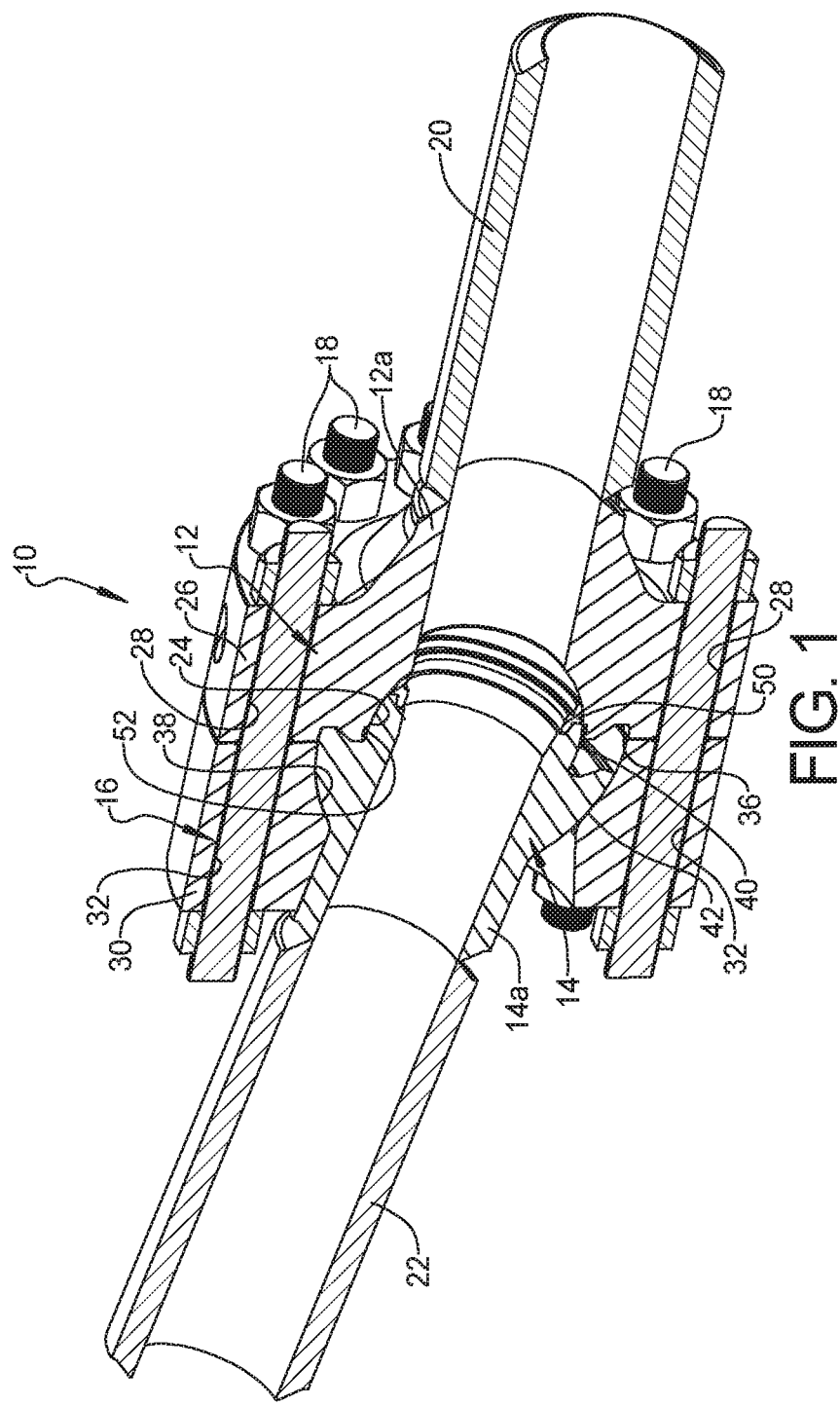

| | | | | |
|---|---|---|---|---|
| 2,369,849 | A | * | 2/1945 | Phillips .................. F16L 59/16<br>174/21 JC |
| 3,292,955 | A | * | 12/1966 | Luther .................. F16L 27/053<br>285/261 |
| 3,454,288 | A | | 7/1969 | Mancusi, Jr. |
| 3,712,645 | A | * | 1/1973 | Herter ..................... F16L 27/04<br>285/95 |
| 3,746,372 | A | * | 7/1973 | Hynes .................. E21B 17/085<br>285/95 |
| 3,754,779 | A | * | 8/1973 | Peress ..................... F16L 27/04<br>285/11 |
| 3,759,550 | A | * | 9/1973 | Peress ..................... F16L 27/04<br>285/11 |
| 4,236,738 | A | * | 12/1980 | Poot ..................... F16L 27/053<br>285/263 |
| 4,486,037 | A | * | 12/1984 | Shotbolt ............... F16L 27/053<br>285/261 |
| 4,840,409 | A | | 6/1989 | Welkey |
| 4,840,410 | A | * | 6/1989 | Welkey ................ F16L 27/053<br>277/625 |
| 4,850,616 | A | * | 7/1989 | Pava ....................... F16L 23/08<br>285/41 |
| 5,160,176 | A | | 11/1992 | Gale |
| 5,368,342 | A | | 11/1994 | Latham et al. |
| 5,975,588 | A | * | 11/1999 | Hesseln ................ F16L 27/047<br>285/263 |
| 6,419,279 | B1 | | 7/2002 | Latham |
| 7,503,590 | B2 | * | 3/2009 | Challender ............. F16L 39/04<br>285/261 |
| 7,717,473 | B1 | * | 5/2010 | Zhang ................... F16L 27/026<br>285/121.1 |
| 2011/0121563 | A1 | * | 5/2011 | Toyoshima .......... F02M 55/005<br>285/263 |
| 2019/0309886 | A1 | * | 10/2019 | Eitzenberger ........... F16L 27/04 |

FOREIGN PATENT DOCUMENTS

| | | |
|---|---|---|
| EP | 2148120 A2 | 1/2010 |
| GB | 1596794 A | 8/1981 |

OTHER PUBLICATIONS

Extended European Search Report dated Jan. 17, 2020 (corresponding to EP 19168590.8).

* cited by examiner

MISALIGNMENT FLANGE FOR PIPELINE INSTALLATIONS

FIELD

The present disclosure relates to an improved misalignment flange for connecting two misaligned pipeline conduits in fluid-tight communication.

BACKGROUND

This section provides background information related to the present disclosure which is not necessarily prior art.

It is common in the oil production and refining industry to utilize a ball and socket type flange to join two misaligned pipe ends. These prior art ball and socket flanges have found application in both above-sea environments and sub-sea environments.

Current misalignment flange designs require a large, heavy assembly. It is desirable to provide a misalignment flange design that is smaller, and lighter without compromising the sealing capability and without limiting the amount of misalignment that can be accommodated.

SUMMARY

This section provides a general summary of the disclosure, and is not a comprehensive disclosure of its full scope or all of its features.

A pipeline misalignment flange, comprising: a socket member having a first substantially spherical internal surface having a first diameter, the socket member having a first face surrounding the first substantially spherical internal surface, the first face having a recessed channel. A retainer member includes a second substantially spherical internal surface having a second diameter larger than the first diameter, the socket member and the retainer member being fastened together. A ball member includes a first substantially spherical external surface for engaging the socket member and having a diameter approximately equal to the first diameter and a second substantially spherical external surface for engaging the retainer member and having a diameter approximately equal to the second diameter. The second substantially spherical external surface includes an axially protruding portion with an undercut, the ball member being pivotable relative to the socket member such that the axially protruding portion of the second substantially spherical external surface is received in the recessed channel.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Figure 2:
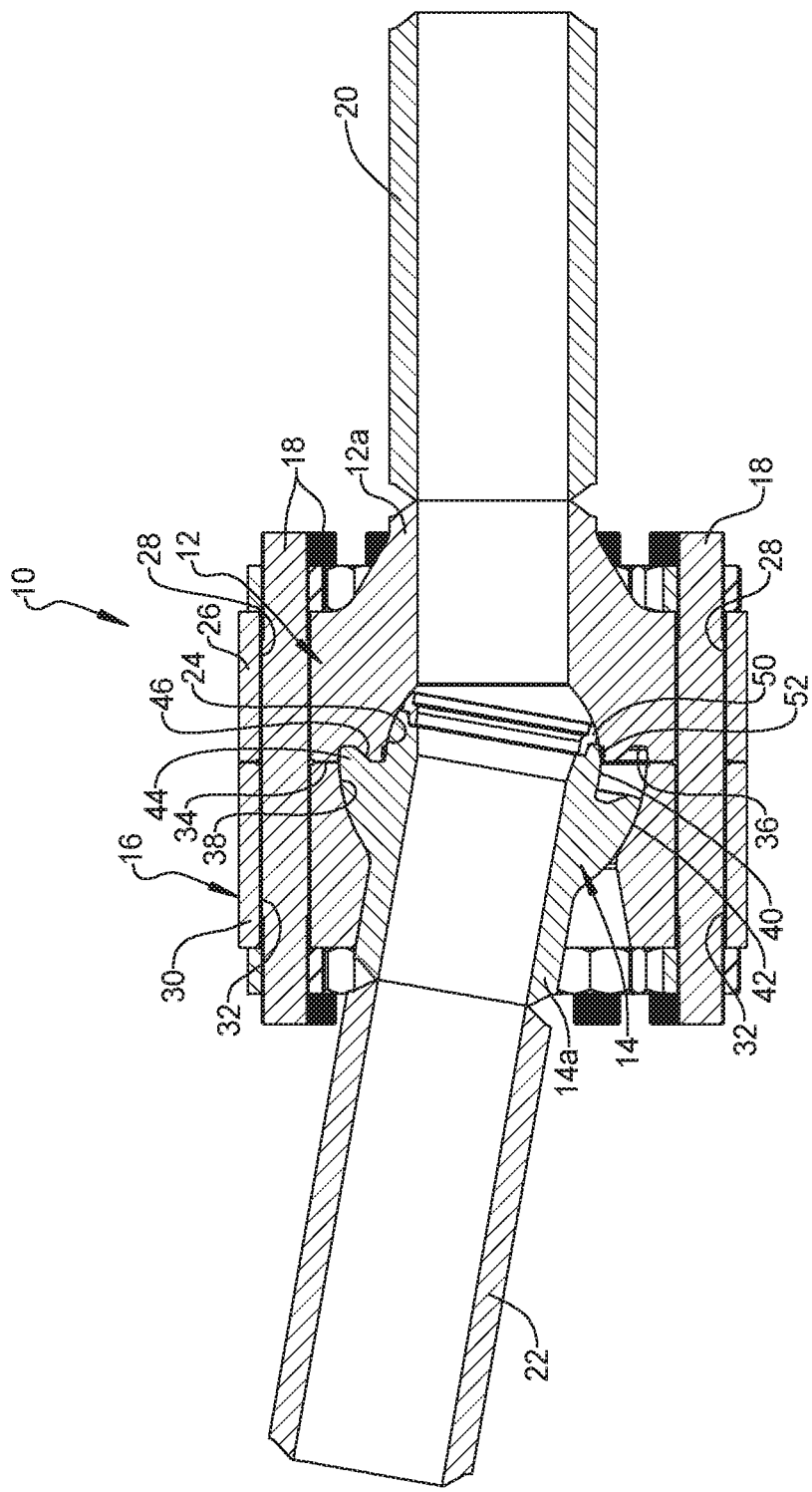

FIG. 1 is a perspective cross-sectional view of a misalignment flange according to the principles of the present disclosure; and FIG. 2 is a cross-sectional view of the misalignment flange shown in FIG. 1.

Corresponding reference numerals indicate corresponding parts throughout the several views of the drawings.

DETAILED DESCRIPTION

Example embodiments will now be described more fully with reference to the accompanying drawings.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

With reference to FIGS. 1 and 2, the misalignment flange 10 according to the principles of the present disclosure will now be described. The misalignment flange 10 includes a socket member 12, a ball member 14, a retainer member 16 and a plurality of fasteners 18. A first pipe 20 can be welded or otherwise connected to a weld flange 12a of the socket member 12 and a second pipe 22 can be welded or otherwise connected to a weld flange 14a of the ball member 14.

Socket member 12 includes a first substantially spherical internal surface 24 having a first diameter. The socket member 12 further includes a first mounting flange 26 having a plurality of apertures 28 for receiving fasteners 18. The retainer member 16 includes a second mounting flange 30 having a plurality of apertures 32 for receiving the fasteners 18 which mount the socket member 12 and the retainer member 16 together. Alternatively, the apertures and fasteners can be eliminated and the socket member 12 and retainer member 16 can be clamped together or otherwise secured together. The socket member 12 includes a first face surface 34 surrounding the first substantially spherical internal surface 24, with the first face having a recessed channel 36 disposed therein.

The retainer member 16 has a second substantially spherical internal surface 38 having a second diameter larger than the first diameter.

The ball member 14 has a first substantially spherical external surface 40 for engaging the first substantially spherical internal surface 24 of the socket member 12. The ball member 14 has a second substantially spherical external surface 42 for engaging the second substantially spherical internal surface 38 of the retainer member 16. The second substantially spherical external surface 42 includes an axially protruding portion 44 with a radial undercut 46. The ball member 14 is adjustably pivotable relative to the socket member 12 and retainer member 16 to account for misalignment between the first pipe 20 and the second pipe 22. The axially protruding portion 44 can be received in the recessed channel 36. The first substantially spherical external surface 40 can include a metal seal ring 50 at a distal end thereof. The first substantially spherical internal surface 24 can include a recessed seal ring 52 engaging the first substantially spherical external surface 40.

The double ball design of the misalignment flange 10 gives the ability to keep the hydrostatic end load low while also having the increased load capacity. By placing the metal-to-metal seal ring 50 at the end point of the smaller inner bowl profile 40 allows the misalignment flange to maintain a smaller seal ring size. This, in turn, allows for a reduced hydrostatic end load. This also allows a significant reduction in raw material size. By including the larger outer ball profile 42, the misalignment flange also maintains a large load capacity with a large bearing surface and, as a result, a higher bending moment capacity without affecting the seal ring size. In addition, the larger outer ball 42 has an overlap at the front end that, at maximum misalignment, increases its load capacity. A comparative single ball design would have a far higher hydrostatic end load at the same pressure capacity expectation and, as a result, the overall package of the double-ball design can be greatly reduced, providing a significant weight and cost savings.

The use of the misalignment flange 10 allows subsea installations to be carried out quicker, thus reducing the cost of the overall operation. One or more misalignment flange 10 can be used as part of a jumper system to give the installation contractors an element of adjustment while eliminating the requirement for jumper flexible bends. This will reduce the requirement of costly, complex and time-consuming metrology measurements prior to final system installation. Additional uses for the misalignment flange 10 is for subsea pipeline installations. Often the actual length of pipe in the exact final location of equipment is unknown right up until the end of an installation program. With the use of the misalignment flange 10, redundancy can be added into the system and final adjustment can be completed prior to installation making the installation quicker and more cost-effective.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A pipeline misalignment flange, comprising:
    a socket member having a first substantially spherical internal seal surface having a first diameter, the socket member having a first face surrounding the first substantially spherical internal seal surface, the first face having a recessed channel having a second substantially spherical internal seal surface having a second diameter larger than the first diameter;
    a retainer member having a third substantially spherical internal surface having a third diameter larger than the first diameter, the socket member and the retainer member being fastened together; and
    a ball member retained between the socket member and the retainer member and having a first substantially spherical external surface received in the first substantially spherical internal seal surface of the socket member and having a fourth diameter smaller than the first diameter, the ball member having a second substantially spherical external surface for engaging the third substantially spherical internal surface of the retainer member and the second substantially spherical internal seal surface of the recessed channel in the first face of the socket member and having a fifth diameter approximately equal to the third diameter, the second substantially spherical external surface including an axially protruding portion with an undercut, the ball member being pivotable relative to the socket member such that the axially protruding portion of the second substantially spherical external seal surface is received in the recessed channel, wherein the first substantially spherical external surface of the ball member includes a metal seal ring at a distal end thereof, the metal seal ring engages with the first substantially spherical internal seal surface;
    wherein the socket member and the retainer member each include a mounting flange having a plurality of apertures for receiving fasteners for securing the socket member and the retainer member together while retaining the ball member in between.

2. The pipeline misalignment flange according to claim 1, wherein the first substantially spherical internal surface includes a recessed seal ring therein.

3. The pipeline misalignment flange according to claim 1, wherein the first substantially spherical external surface is at a distal end of the ball member.

4. The pipeline misalignment flange according to claim 1, further comprising a first pipe welded to a weld flange of the socket member.

5. The pipeline misalignment flange according to claim 4, further comprising a second pipe welded to a weld flange of the ball member.

* * * * *